March 21, 1961     H. MALIN     2,976,270
PROCESS FOR CONTINUOUSLY METERING CATALYST
INTO A POLYMERIZATION SYSTEM
Filed March 16, 1956
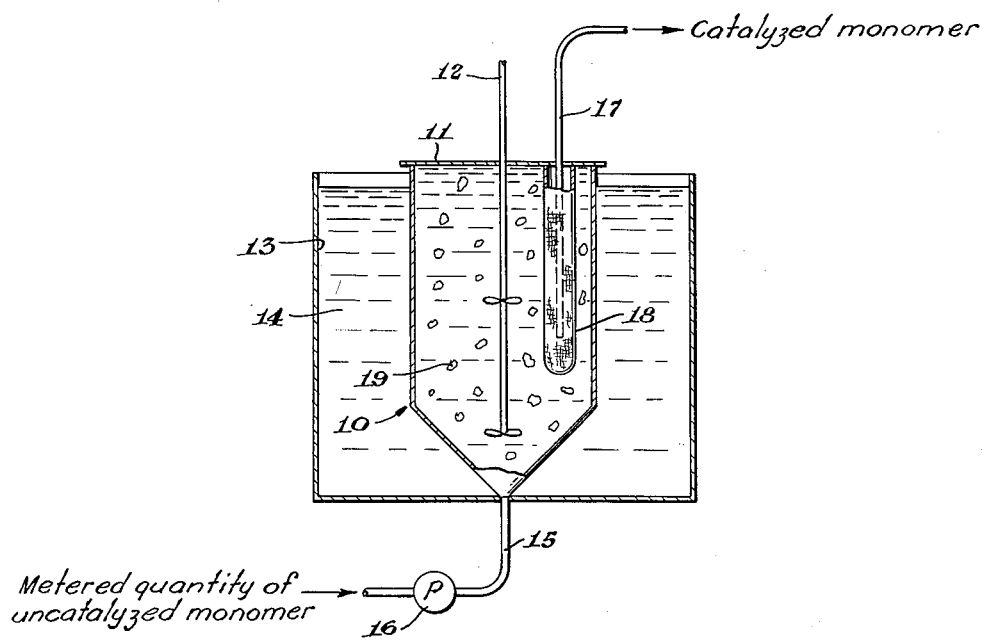
INVENTOR.
Herbert Malin
BY
Griswold & Burdick
ATTORNEYS – # United States Patent Office 2,976,270
Patented Mar. 21, 1961

2,976,270

PROCESS FOR CONTINUOUSLY METERING CATALYST INTO A POLYMERIZATION SYSTEM

Herbert Malin, Midland, Mich., assignor to The Dow Chemical Company, Midland, Mich., a corporation of Delaware Filed Mar. 16, 1956, Ser. No. 571,928

5 Claims. (Cl. 260—92.8)

This invention relates to an improved process for continuously metering catalysts into polymerization systems. More particularly it relates to a process for continuously metering oil-soluble catalysts at a constant rate into a system comprising monoethylenic monomers.

For economic reasons and for reasons of increased efficiency, continuous polymerization systems are most desirable. In recent years many such systems based on emulsion and solution polymerization have appeared. However, successful continuous suspension polymerization systems have not been so prevalent because of the many difficult engineering problems encountered. A description of one such system is disclosed in a copending application of Ralph M. Wiley, U.S. Serial No. 451,681, dated August 23, 1954, now U.S. Patent No. 2,875,185. In that application a thickened aqueous dispersion of a polymerizable substance is caused to polymerize under conditions that the polymerizing discontinuous phase does not separate gravitationally from the continuous aqueous phase and under conditions of no turbulence. That process lends itself particularly well to continuous operation. One of the most difficult problems inherent in that process as well as any other continuous suspension polymerization process is the continuous addition of the proper amount of catalyst. The catalysts generally employed in any suspension polymerization are solid and insoluble in water. In batch operations no great difficulty is encountered since the amount of solid catalyst needed for the complete polymerization may be added to the polymerization charge in the reaction vessel immediately preceding polymerization and dispersed with relatively high speed agitation. However, in continuous polymerization, where fresh monomer is being added either continuously or intermittently in small increments, the possibility of opening the polymerization vessel to add solid catalyst continuously or intermittently does not exist. The recognized alternatives then were to use a system of valves for feeding solids intermittently to the closed polymerization system or to employ an organic water immiscible solvent for the catalyst, forming a solution, and meter the so-formed solution into the system. Such prior method can not be used in non agitated systems such as that disclosed in the Wiley application discussed supra, and the latter method is unsatisfactory in that the solvent is a contaminant which must eventually be removed from the polymer.

It is accordingly the principal object of this invention to provide a process whereby solid oil-soluble polymerization catalysts may be metered continuously into a polymerization system.

It is a further object to provide such a process which may be employed in a continuous polymerization system.

It is a still further object to provide such a process wherein the proper amount of solid catalyst is added automatically to a continuous polymerization system.

It has now been found that the proper amount of a solid, monomer-soluble, polymerization catalyst may be metered continuously into a polymerization system by the continuous dissolution of the catalyst in the polymerizable substance or in a portion thereof at a temperature at which the amount of catalyst soluble in the polymerizable substance to produce a saturated solution is in the concentration range required for the polymerization process. By means of this process the difficult continuous or intermittent addition of solid materials to a closed system is overcome and no contaminants are added to the polymerization system which have to be removed following the completion of polymerization.

The monomers which may be employed in the process of this invention are those ethylenically unsaturated monomers which are supplied as liquids to the polymerization vessel and which are capable of polymerization by a free-radical mechanism and in which polymerization may be initiated in the usual manner by free-radical catalysts, exemplary of which are the solid organic peroxides. Typical examples of useful monomers are the vinyl esters, such as vinyl acetate, vinyl chloride, and vinyl bromide, the vinylidene compounds, such as vinylidene chloride and the alkenyl aromatic monomers, such as styrene. The process may be employed in binary and ternary polymerization systems as well as those systems employing but one monomer. It is preferred to dissolve the catalyst in only one monomer and add that to a premixed blend of monomers prior to polymerization. However, if the solubility of the catalyst in mixed monomers is known, the mixed monomers in the desired ratio may be employed to dissolve the monomer.

The catalysts which may be employed are those commonly used in suspension polymerizations such as benzoyl peroxide and lauroyl peroxide. For purposes of safety and because of more desirable polymerization characteristics lauroyl peroxide is to be preferred in this process.

The process is carried out by contacting an amount of catalyst in excess of that which may be dissolved with the monomer at a temperature at which the catalyst will dissolve in the monomer to the extent required for polymerization and for a time sufficient to provide a saturated solution of catalyst in monomer. The times, temperatures, and concentrations required will depend upon the particular polymerization system. The catalyst concentration for any given polymerization will be known. To achieve that catalyst concentration will then require only simple preliminary calculations and experiments to determine the temperature at which the monomer will be saturated with that amount of catalyst and the minimum time necessary to achieve that saturation.

For reasons of safety the temperature should be low enough that substantially no polymerization occurs prior to introduction into the polymerizing system.

A preferred embodiment of an apparatus for carrying out the process of this invention is shown in the accompanying schematic drawing and is described in the following description. Other means and apparatuses will be apparent to those skilled in the art. In the illustrated embodiment a cartridge 10 having a tightly fitting flange 11 and an agitator 12 through that flange 11 is immersed in a bath 13 of a suitable heat transfer fluid 14. The bath 13 may be kept at a constant temperature by any known means (not shown) such as ice, refrigerating coils, and the like. Additionally agitators (not shown) may be placed in the bath 13 to help maintain the constant temperature. Fitted to the base of the cartridge 10 and extending through the bottom of the bath 13 is an inlet line 15 for introducing a metered quantity of fresh uncatalyzed monomer into the cartridge 10. The monomer may be metered by means of a metering pump 16, flowmeter or other known means. This monomer may come from any suitable inventory (not shown) of uncatalyzed uninhibited refrigerated monomer. If possible it is desirable to have the inventory of uncatalyzed monomer at about the same temperature as the constant temperature bath 13. Extending through the flange 11 is an outlet line 17 leading to the polymerization vessel (not shown). The outlet line 17 extends into the cartridge 10 for a short distance and attached to the line 17 inside the cartridge 10 is a filter sock 18.

In operation the cartridge 10 is filled with the desired amount of catalyst 19 in granular condition to allow the passage of liquids therethrough. To avoid shutdowns for repacking the cartridge 10 because of complete utilization of catalyst 19 it is preferred to fill the cartridge 10 as completely as possible and still be able to agitate the mixture. Monomer is passed into the cartridge 10 through the inlet line 15 until the cartridge 10 is hydrostatically full. The monomer is then metered into the cartridge 10 at the rate at which the catalyzed monomer is to be fed into the polymerization system.

The size, materials of construction, and characteristics of the catalyzer so described will be determined by the particular system being employed. The size of the cartridge will depend to a great extent on the contact time required for the monomer and catalyst to produce a saturated solution. When a relatively long time is required a correspondingly large cartridge must be employed. The materials of construction must be inert to catalyst, monomer, and catalyzed monomer to prevent contamination and premature polymerization of monomer. The materials within the bath should preferably be good heat conductors to assure efficient heat transfer. Outside of the bath insulation should be provided so that the temperature of the catalyzed monomer does not rise prior to entering the polymerization system. For reasons of safety it is preferred to operate with explosion proof equipment.

Although the process may be operated using a static bed of catalyst and passing the monomer therethrough it is preferred to employ an agitated system to avoid any possibility of short circuiting and to aid the dissolution process. Agitated systems required less contact time between monomer and the excess of catalyst and accordingly are considerably safer.

From the above description it is obvious that the monomer must be in the liquid form. It should likewise be apparent that unless suitable nozzles or valves are installed in the outlet line, the process must operate at a pressure greater than the pressure head of the polymerization system.

The greatest advantage of this process lies in its safety. Although a solution of catalyst in monomer is employed, the catalyst is added to the monomer immediately before polymerization and at a low temperature to avoid premature polymerization. The hazards inherent in preparing a large inventory of catalyst in all of the monomer that is to be used and storing that large amount of catalyzed monomer should be immediately apparent. Additionally, when the whole amount of monomer is catalyzed and fed into the system continuously, the metering of catalyzed monomer through flow meters, metering pumps and the like is required. In the process of this invention the uncatalyzed monomer is metered into the catalyst and is then fed automatically in correct concentration into the polymerization system immediately. The chances for premature polymerization or decomposition are minimized since large inventories of catalyzed monomer are not required, the catalyzed monomer is fed immediately into the polymerization system, and the catalyzed monomer is subjected to a minimum of mechanical shock prior to polymerization.

The process may be employed for either intermittent or continuous addition of catalyst. However, as is true with any chemical reaction operating at a condition of equilibrium, the intermittent addition of one of the reactants upsets such an equilibrium. Additionally the intermittent addition of catalyst with this process requires between additions that the catalyzed monomer be stagnant presenting the possibility for premature polymerizations. Thus in the case of intermittent addition an investigator must take every precaution for assuring temperature control. Because of the above disadvantages of intermittent addition, it is preferred to employ the process in the continuous addition of catalyst.

To illustrate the solubility variance of the solid oil soluble catalysts in monomer, the following table is presented showing the solubility of lauroyl peroxide in vinyl chloride at various temperatures. All percentages are by weight.

| Temperature (° C.) | Percent solubility to saturation |
| --- | --- |
| −15 | 1.6 |
| −13 | 2.0 |
| −10 | 2.6 |
| −7 | 3.7 |
| −5 | 4.8 |
| 0 | 9.6 |

Since vinyl chloride polymerizations are usually run with from 0.5 to 5 percent catalyst, the temperature at which the cartridge should be maintained should be from about −5 to about −20° C.

By way of example, a metered quantity of vinyl chloride was provided from an inventory of uninhibited uncatalyzed vinyl chloride by passage through a metering pump. The metered vinyl chloride passed into an agitated cartridge containing a large excess of lauroyl peroxide. The cartridge was hydrostatically full of the mixture. The cartridge was set into a temperature bath controlled at −13° C. by refrigeration coils. The catalyzed vinyl chloride passed through a filter sock thence through an outlet line and immediately into a continuous suspension polymerization. The catalyzed vinyl chloride leaving the cartridge contained 2 percent by weight of lauroyl peroxide. Two cartridges were so employed with a valve to switch from one cartridge to the other to provide time for repacking the cartridges. The polymerization system was successfully operated continuously for a period of six weeks.

The process for continuously adding catalyst may be employed with any polymerization technique utilizing an oil soluble catalyst. Thus it finds use in suspension, bulk, and solution polymerizations.

I claim:

1. A process for the continuous introduction to an addition polymerization system of an oil-soluble free radical polymerization catalyst to maintain the desired concentration thereof in the system, comprising metering liquid uncatalyzed monomer into a zone containing an amount of said oil-soluble free radical polymerization catalyst in excess of that capable of dissolution at a temperature at which only enough catalyst will dissolve in the monomer to produce a saturated solution thereof at a concentration desired for subsequent polymerization, the metering of said uncatalyzed monomer into said zone being at the desired rate of feed to a subsequent polymerization, and withdrawing said saturated solution of catalyst in monomer from said zone and passing the solution into a polymerization zone.

2. The process claimed in claim 1 wherein said oil-soluble, free-radical polymerization catalyst is a solid organic peroxide.

3. The process claimed in claim 1 wherein said catalyst is lauroyl peroxide.

4. The process claimed in claim 1 wherein said monomeric material is vinyl chloride.

5. The process claimed in claim 3 wherein the temperature of dissolution is from −5° to −20° C.

(References on following page)

References Cited in the file of this patent

UNITED STATES PATENTS

| | | | |
|---|---|---|---|
| 1,241,738 | Klatte et al. | Oct. 2, | 1917 |
| 2,326,326 | Breedis | Aug. 10, | 1943 |
| 2,405,480 | Wilde | Aug. 6, | 1946 |
| 2,475,016 | De Nie | July 5, | 1949 |
| 2,694,700 | Shanta | Nov. 16, | 1954 |

OTHER REFERENCES

Brothman et al.: Chem. and Met. Eng., March 1943, pp., 108–112.